(12) United States Patent
Skow

(10) Patent No.: US 8,782,097 B2
(45) Date of Patent: Jul. 15, 2014

(54) MULTIPLE SYSTEM COMPATIBLE DATABASE SYSTEM AND METHOD

(75) Inventor: Gregg E. Skow, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 2311 days.

(21) Appl. No.: 10/627,492

(22) Filed: Jul. 25, 2003

(65) Prior Publication Data

US 2005/0021535 A1    Jan. 27, 2005

(51) Int. Cl.
*G06F 7/00*    (2006.01)
*G06F 17/30*    (2006.01)

(52) U.S. Cl.
USPC .............. 707/803; 707/920; 701/430

(58) Field of Classification Search
USPC ........................................ 707/100
See application file for complete search history.

(56) References Cited

U.S. PATENT DOCUMENTS

| | | | | |
|---|---|---|---|---|
| 5,201,046 A | * | 4/1993 | Goldberg et al. | ............. 707/100 |
| 5,566,333 A | | 10/1996 | Olson et al. | |
| 5,649,181 A | * | 7/1997 | French et al. | ...................... 707/3 |
| 5,710,915 A | * | 1/1998 | McElhiney | ........................ 707/3 |
| 6,804,664 B1 | * | 10/2004 | Hartman et al. | ................... 707/3 |
| 6,879,976 B1 | * | 4/2005 | Brookler et al. | .................... 707/3 |
| 7,046,778 B2 | * | 5/2006 | Martin et al. | ............ 379/201.01 |
| 2002/0112230 A1 | | 8/2002 | Scott | |
| 2003/0115324 A1 | * | 6/2003 | Blumenau et al. | ............ 709/225 |

FOREIGN PATENT DOCUMENTS

| | | |
|---|---|---|
| WO | WO00/36503 A | 6/2000 |
| WO | WO01/11471 A1 | 2/2001 |
| WO | WO01/80092 A2 | 10/2001 |

OTHER PUBLICATIONS

PCT International Search Report: PCT/US2004/023441, Aug. 8, 2005, EP International Search Authority, 7 pages.

* cited by examiner

*Primary Examiner* — Kimberly Wilson
(74) *Attorney, Agent, or Firm* — Ingrassia Fisher & Lorenz, P.C.

(57) ABSTRACT

A database system and method that is compatible with multiple end-use systems, even when changes and/or updates are made to the layout, format, and/or data content in the database. The database includes a structure section and a data section. The data section includes a plurality of stored data records that have one or more features. The structure section includes a feature mask that has data stored therein that indicates whether a particular one of the data records is compatible with one or more end-user systems.

29 Claims, 6 Drawing Sheets

MULTIPLE SYSTEM COMPATIBLE DATABASE SYSTEM AND METHOD

TECHNICAL FIELD

The present invention generally relates to a database system and, more particularly, to a database system and method that is compatible with multiple end-user systems.

BACKGROUND

Various systems use data that is stored in one or more databases to, for example, implement one or more functions, perform one or more calculations, or both. For example, various embedded avionics systems used in many aircraft may use one or more databases to implement various functions. An aircraft flight management system (FMS) is just one example of an embedded avionics system installed in many aircraft that uses data stored in a database to implement its functionality.

A flight management system (FMS) may be used to perform a variety of tasks for an aircraft. For example, a pilot may use the FMS to generate all, or a portion, of an aircraft flight plan, including a variety of course changes. The flight plan may then be displayed on a display device. The FMS may additionally interface with the aircraft autopilot system and automatically direct the aircraft in accordance with the programmed flight plan. To perform at least these tasks, the FMS may use avionics data supplied from various avionics-related sensors, and navigational data retrieved from a navigation database. The avionics data may include data representative of the state of the aircraft such as, for example, aircraft speed, altitude, and heading. The navigational data may include various flight plan related data such as, for example, waypoints, distances between waypoints, headings between waypoints, data related to different airports, navigational aids, obstructions, special use airspace, political boundaries, communication frequencies, and aircraft approach information.

The data stored in the navigation database may be changed or periodically updated. These changes and periodic updates may be implemented to correct one or more problems with a portion of the data or with the entire database. The navigational database may also be updated to reflect changes represented by some or all of the stored data. For example, the navigation database may be updated because, among other things, new navigation aids were created, old navigation aids were retired, one or more airports added or retired one or more runways, or communication frequencies were changed. The navigation database may also be updated to include new or different content such as, for example, one or more new or additional data tables, and/or one or more new or additional data fields. Moreover, some governmental regulations indicate that navigation databases should be updated on a regular basis such as, for example, every twenty-eight days.

It is noted that, in most instances, an FMS is designed for a specific type of aircraft. Hence, an FMS installed in, for example, a Boeing 737 may differ from an FMS installed in an Airbus A-310. Concomitantly, there are also, in most instances, a some differences in navigation data for each type of aircraft. It is additionally noted that other systems installed in an aircraft may use all, or a portion, of the navigational data in the navigation database to implement various functions. When a navigation database is updated and/or changed, some or all of the updated or changed data may not be supported by all of the systems in an aircraft. In addition, numerous navigation database updates may be needed by an airline to support each of the different aircraft in its fleet. Furthermore, if a system that uses the navigation database is upgraded some, or all, of the navigation database may not be compatible with the upgraded system. Hence, in order to provide a single database that may be compatible with different systems, some data content that may not be supported by one or more systems may be omitted from the database, resulting in a subset of data for each these systems. The cost associated with filtering out non-compatible data can be significant.

Moreover, access to the navigation database by the FMS, or other systems, may be implemented via database access software, which may be resident in the system. In order to access the navigational data quickly, the database access software may need intrinsic knowledge of the layout and/or format of the navigation data. In such instances, an update and/or change to the navigation data may result in the need to update the database access software, as well. This can result in increased time and expense.

Accordingly, it is desirable to provide a database system and method that improves on one or more of the drawbacks noted above. Namely, a database system and method that does not adversely affect compatibility when changes and/or updates are made to the database, and/or when changes and/or updates are made to systems that use the database. It is additionally desirable to provided a database system and method that reduces or substantially eliminates the costs and man-hour efforts associated with these drawbacks. The present invention addresses one or more of these drawbacks. Furthermore, other desirable features and characteristics of the present invention will become apparent from the subsequent detailed description of the invention and the appended claims, taken in conjunction with the accompanying drawings and this background of the invention.

BRIEF SUMMARY

A database system and method is provided that is compatible with multiple end-use systems, even when changes and/or updates are made to the layout, format, and/or data content in the database.

In one embodiment, and by way of example only, a database that is compatible with multiple end-user systems includes a data section and a structure section. The data section includes a plurality of data records. The structure section includes at least a feature mask, which includes data that indicates whether a particular one of the data records is compatible with one or more of the end-user systems.

In another exemplary embodiment, a method of generating a database that is compatible with multiple end-user systems includes generating a data section, and storing a plurality of data records in the data section. A feature mask is generated that includes data that indicates whether a particular one of the stored data records is compatible with one or more of the end-user systems.

In yet another exemplary embodiment, a method of storing data to, and retrieving data from, a database that includes at least a data section and a structure section, and that is compatible with multiple end-user systems, includes storing a plurality of data records in the data section. A feature mask is stored in the structure section. The feature mask includes data that indicates whether a particular one of the stored data records is compatible with one or more of the end-user systems. A request to retrieve data from a stored data record and supply the retrieved data to one of the end-user systems is received, and at least a portion of the data record having the requested data is compared with at least a portion of the feature mask, to thereby determine whether the requested data is compatible with the end-user system to be supplied with the requested data.

In still another exemplary embodiment, a computer system includes a processor, memory, and a database. The memory is in operable communication with the processor, and the database is stored in the memory. The database is compatible with multiple end-user systems, and includes a data section and a structure section. The data section includes a plurality of data records, and the structure section includes a feature mask. The feature mask includes data that indicates whether a particular one of the data records is compatible with one or more of the end-user systems.

BRIEF DESCRIPTION OF THE DRAWINGS

The present invention will hereinafter be described in conjunction with the following drawing figures, wherein like numerals denote like elements, and FIG. 1 a simplified representation of a system that includes an exemplary embodiment of the database system and method according to the present invention.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, while the database system and method is, for convenience, described as being used in an aircraft environment, and specifically a plurality of flight management systems, it should be appreciated that the database, database system, and method may also be implemented in various other end-use environments.

Figure 1:
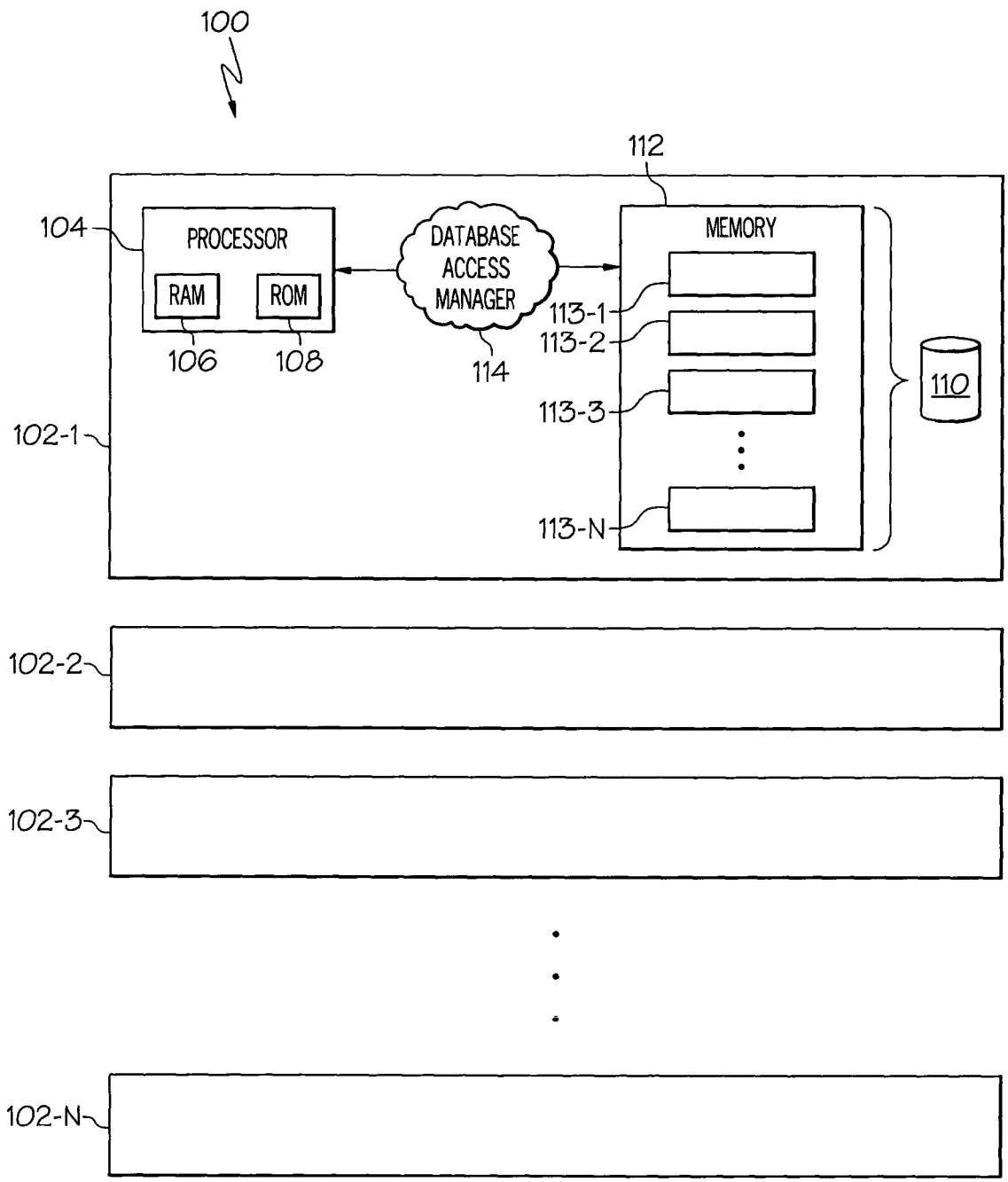

Turning now to the description, a simplified representation of a system that includes an embodiment of the database system and method is shown in FIG. 1. The system 100 includes a plurality of end-user systems 102-1, 102-2, 102-3, . . . 102-N, which in the depicted embodiment are each embedded real-time systems such as, for example, aircraft flight maintenance systems (FMSs). It will be appreciated that one or more of the end-user systems 102-1, 102-2, 102-3, . . . 102-N may be physically located in the same place or separate from one another. It will additionally be appreciated that, although only one end-user system 102-1 is shown in detail in FIG. 1, the other end-user systems 102-2, 102-3, 102-4, . . . 102-N also each include at least a processor 104, which may include one or more on-board memory sections such as, for example, a RAM 106 and a ROM 108, and a database 110.

The processor 104 may be any one of numerous known general purpose processors or an application specific processor that operates in response to program instructions. Such program instructions may be stored in either or both the RAM 106 and the ROM 108. For example, the operating system software may be stored in the ROM 108, whereas various operating mode software routines and various operational parameters may be stored in the RAM 106. It will be appreciated that this is merely exemplary of one scheme for storing operating software and software routines, and that various other storage schemes may be implemented. It will also be appreciated that the processor may be implemented using various other circuits, not just a programmable processor. For example, digital logic circuits and analog signal processing circuits could also be used.

The database 110 is stored in a memory circuit 112 that is in operable communication with the processor 104. The memory circuit 112, as is generally known, includes a plurality of memory registers 113-1, 113-2, 113-3, . . . 113-N, in which data are stored. The configuration and type of at least a portion of the data stored in the memory registers 113-1, 113-2, 113-3, . . . 113-N is discussed in more detail further below. It will be appreciated that, although the database 110 is, for clarity and convenience, shown as being stored separate from the processor 104, the database 110 could be loaded into the on-board RAM 106, or one or more memory circuits 112 could be integrally formed as part of the processor 104, and/or RAM 106, and/or ROM 108. The memory circuit 112 could also be part of a device or system that is physically separate from the end-user system 102.

Figure 2:
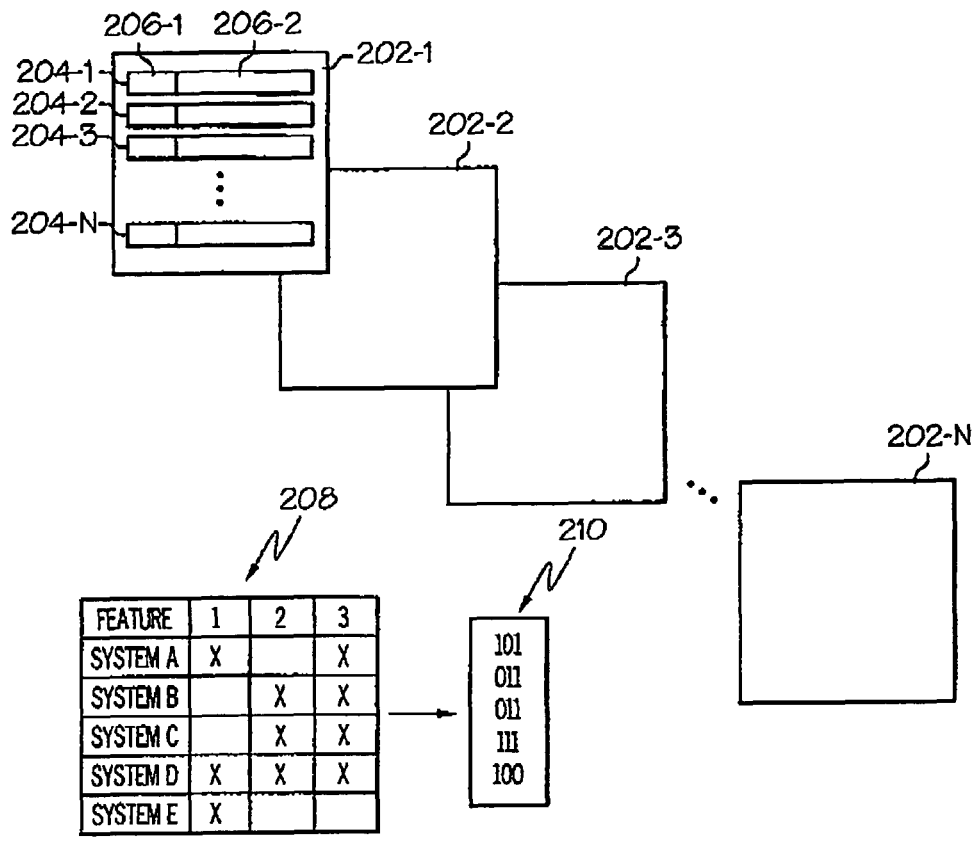
FIG. 2 is a simplified diagram that provides a general overview of how compatibility between data records and the various systems shown in FIG. 1 is determined, according to an exemplary embodiment of the present invention.

The database 110 includes data stored therein that is used by one or more of the various end-user systems 102 to implement various functions. It will be appreciated that the database 110 may be centrally located on a single computer or other memory device. However, in the depicted embodiment, the database 110 is separately loaded into each of the various end-user systems 102-1, 102-2, 102-3, . . . 102-N. The database 110, as shown more clearly in FIG. 2, is preferably configured to include a plurality of data tables 202-1, 202-2, 202-3, . . . 202-N, each of which includes a plurality of data records 204-1, 204-2, 204-3, . . . 204-N. In addition, the data stored in the database 110 is formatted such that each data record 204-1, 204-2, 204-3, . . . 204-N indicates which system (or systems) 102 with which the data record is compatible. Thus, in the depicted embodiment, the same database 110 is loaded on, and used by, each of the end-user systems 102-1, 102-2, 102-3, . . . 102-N, and any of the data records 204-1, 204-2, 204-3, . . . 204-N that are not compatible with one or more of the end-user systems 102-1, 102-2, 102-3, . . . 102-N, are not accessed by the non-compatible system. Moreover, a non-compatible system will not attempt to access these data records. It will be appreciated that the database 110 loaded on each system is thus a superset of data, which includes data that is both compatible and not compatible with each of the end-user systems 102-1, 102-2, 102-3, . . . 102-N.

To implement the above-described functionality, in which multiple end-user systems 102-1, 102-2, 102-3, . . . 102-N share a single database that is a superset of data content, the database 110 is formatted to include the schema of each of the data records 204-1, 204-2, 204-3, . . . 204-N in the database 110. Specifically, each data record 204-1, 204-2, 204-3, . . . 204-N in the database 110 includes data representative of its compatibility with each end-user system 102-1, 102-2, 102-3, . . . 102-N. In a particular preferred embodiment, and with continued reference to FIG. 2, this is implemented by organizing each data record 204 into a plurality of fields 206 that includes at least a data field 206-1 and a compatibility or "feature" field 206-2. The data field 206-1 is where the data used by the end-user system application software is loaded. The feature field 206-2 includes data representative of each feature, or "attribute," of that data record 204-1, 204-2, 204-3, . . . 204-N. As used herein, the terms "feature" and "attribute" are interchangeable, and are generally used to convey those characteristics of a data record that may affect its compatibility with an end-user system 102. Non-limiting examples of data record features include the particular revision cycle, the particular data cycle, and the particular data layout of a data record.

In addition to including the feature field 206 in each data record 204-1, 204-2, 204-3, . . . 204-N, a feature/system matrix 208 is developed for each of the data tables 202-1, 202-2, 202-3, . . . 202-N. A feature mask 210 for each of the data tables 202-1, 202-2, 202-3, . . . 202-N is then generated from each feature/system matrix 208. The feature mask 210 is compared with the feature field 206 in each data record 204-1, 204-2, 204-3, . . . 204-N of the data table 202-1, 202-2, 202-3, . . . 202-N with which the particular feature mask 210 is associated. Based on this comparison, a determination is made as to whether a particular data record 204-1, 204-2, 204-3, . . . 204-N is compatible with, and retrievable by, a particular end-use system 102-1, 102-2, 102-3, . . . 102-N. The comparisons of the feature fields 206 and feature masks 210 is implemented and managed by a database access manager 114, which may be stored in the RAM 106, ROM 108, and/or memory circuit 112, and which will be described in more detail further below. Before describing the database access manager 114, however, a more detailed description of a particular preferred format of the database 110 will now be described.

Figure 3:
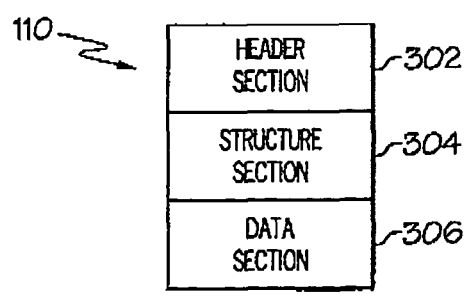
FIG. 3 illustrates the overall organization of an exemplary embodiment of the database that may be used in the system of FIG. 1.

The database 110, as shown in FIG. 3, is preferably organized into three major sections, a header section 302, a structure section 304, and a data section 306. The header section 302 is preferably stored first in memory and includes various types of identification indicia, and also indicates where the structure section 304 begins. The structure section 304 includes information used by the database access manager 114 to access the data stored in the data section 306. The data section 306 includes the data used by each of the end-user systems 102-1, 102-2, 102-3, . . . 102-N to implement its functionality and, as was described above, is organized into a plurality data tables 202-1, 202-2, 202-3, . . . 202-N, and data records 204-1, 204-2, 204-3, . . . 204-N.

Figure 4:
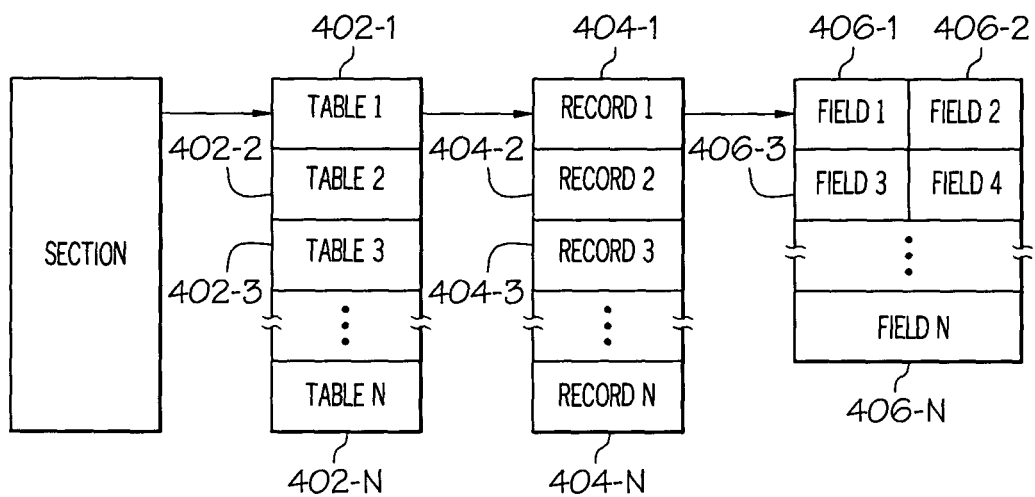
FIG. 4 depicts the organization of each of the exemplary sections that are shown in FIG. 3.

With reference now to FIG. 4, it is seen that the header and structure sections 302, 304 are preferably organized similar to the data section 306. That is, these sections are organized into one or more tables 402-1, 402-2, 402-3, . . . 402-N. Each table 402-1, 402-2, 402-3, . . . 402-N is in turn organized into one or more records 404-1, 404-2, 404-3, . . . 404-N, and each record is organized into one or more fields 406-1, 406-2, 406-3, . . . 406-N that are each arranged into data segments of a predetermined bit length. It will be appreciated that this predetermined bit length may be any one of various numbers of bits; however, in a particular preferred embodiment, each data segment is a 32-bit word. It will additionally be appreciated that the number of tables 402, records 404, and fields 406 within each database section may vary. Moreover, the skilled artisan will readily appreciate that the arrangement, length, and number of fields 406 within a particular record 404 may vary, while implementing the same functionality. Thus, in the proceeding discussion, a detailed description of each data record 404 is not provided. Rather, the type of data that is included in various fields 406 within each record 404, and its purpose, is generally described.

Figure 5:
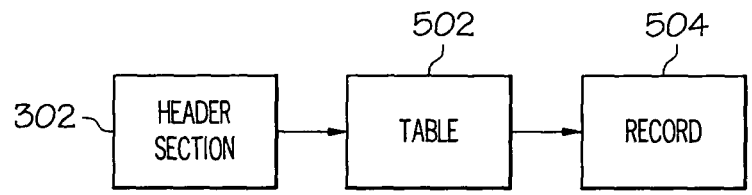
FIG. 5 illustrates an exemplary organization of the header section of the database.

Turning now to FIG. 5, it is seen that in the depicted embodiment the header section 302 includes only one data table 502, and that this single data table 502 includes only one record 504. The header section 302, as was noted above, includes various identification indicia. This identification indicia is arranged in various fields in the record 504 and includes, for example, data representative of the size of the entire database 110, the size of the header section 302, the database version, the date on which the database version was compiled, the data cycle of each data table, and the identification of each data table. The header section record 504 also includes data representative of the location in memory of the structure section 304. The structure section 304, as was noted above, includes data that is used by the database access manager 114 to access the data in the data section 306 and, with reference now to FIG. 6, will be described in more detail.

Figure 6:
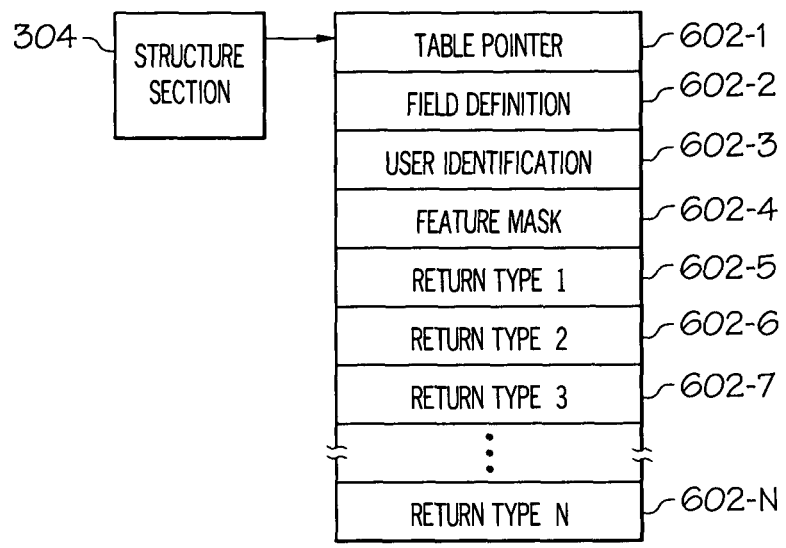
FIG. 6 illustrates an exemplary organization of the structure section of the database.

The structure section 304, as shown in FIG. 6, preferably includes a plurality of tables 602. In the depicted embodiment, these tables include a table pointer table 602-1, a field definition table 602-2, a user identification table 602-3, a feature (or compatibility) mask table 602-4, and one or more return type tables 602-5, 602-6, 602-7, . . . 602-N. The purpose and content of each of these tables will now be described, beginning with the table pointer table 602-1.

Figure 7:
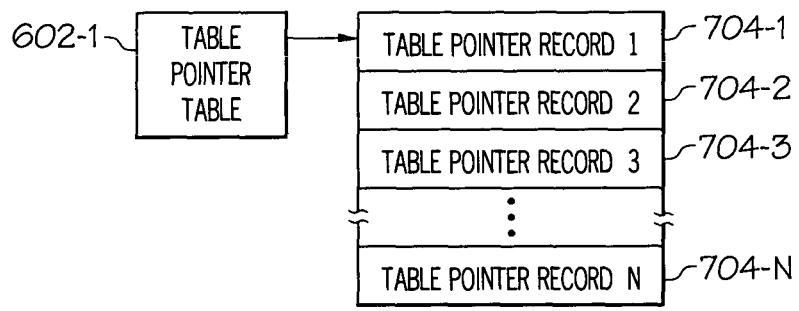
FIGS. 7-11 illustrate the exemplary organization of various tables included in the structure section depicted in FIG. 6.

The table pointer table 602-1, as shown in FIG. 7, includes a plurality of table pointer records 704-1, 704-2, 704-3, . . . 704-N. Each table pointer record 704-1, 704-2, 704-3, . . . 704-N includes at least data representative of the location and name of at least some of the tables 402-1, 402-2, 402-3, . . . 402-N in the database 110, and the number and size of each record 404-1, 404-2, 404-3, . . . 404-N within each table 402-1, 402-2, 402-3, . . . 402-N having a table pointer record 704-1, 704-2, 704-3, . . . 704-N. In a particular preferred embodiment, the table pointer table 602-1 includes a table pointer record 704-1, 704-2, 704-3, . . . 704-N for each table in the structure section 304 and the data section 306, and none for the header section table 402. It will be appreciated, however, that this is merely exemplary of a particular preferred embodiment, and that the table pointer table 602-1 could, for example, include a table pointer record 704 for the header section table 402.

Figure 8:
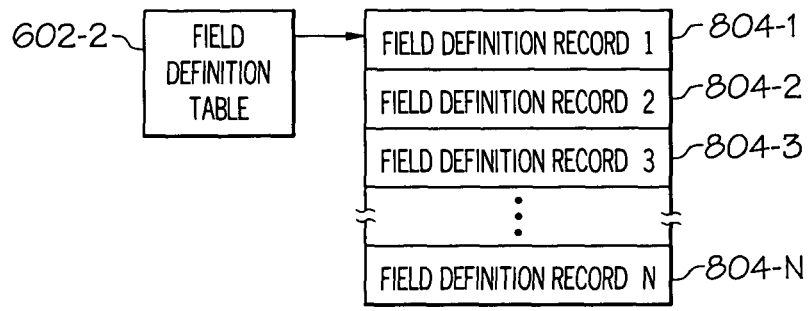

The field definition table 602-2, which is shown in FIG. 8, also includes a plurality of records, referred to herein as field definition records 804-1, 804-2, 804-3, . . . 804-N. The field definition records 804-1, 804-2, 804-3, . . . 804-N each include at least data representative of the name, location within a given record, and type of each field 406-1, 406-2, 406-3, . . . 406-N in at least a portion of the database 110. The data in each of the field definition records 804-1, 804-2, 804-3, . . . 804-N, in particular the data representative of field type, improves access performance by the database access manager 114, since this data allows the database access manager 114 to determine the processing necessary for each particular field. In a particular preferred embodiment, field definition records 804-1, 804-2, 804-3, . . . 804-N are provided only for fields in the data section 306. However, it will be appreciated that this is merely exemplary of a particular preferred embodiment, and that the field definition table 602-2 could also include field definition records 804 for either or both the header section 302 and the structure section 304.

Figure 9:
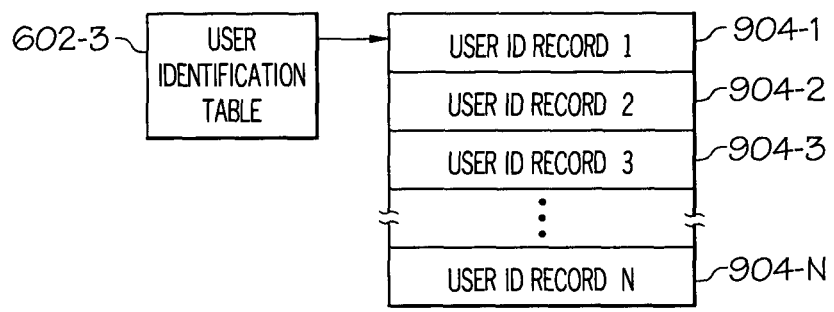

Turning now to FIG. 9, it is seen that the user identification table 602-3 includes a plurality of user identification records 904-1, 904-2, 904-3, . . . 904-N. The user identification records 904-1, 904-2, 904-3, . . . 904-N each include data representative of a different end-user system 102-1, 102-2, 102-3, ... 102-N. In particular, each user identification record 904-1, 904-2, 904-3, ... 904-N correlates a unique identifier, using a number, name, or both, with each end-user system 102-1, 102-2, 102-3, ... 102-N. As will be described in more detail below, the database access manager 114 uses the user identification table 602-3 to determine whether the database 110 contains data that is compatible with the particular end-user system 102-1, 102-2, 102-3, ... 102-N on which the database 110 is loaded. As will be described more fully below, the database access manager 114 determines the compatibility of a data record with a particular end-user system 102-1, 102-2, 102-3, ... 102-N based on the data in the user identification table 602-3, in conjunction with, among other data, the feature mask table 602-4, which will now be described.

Figure 10:
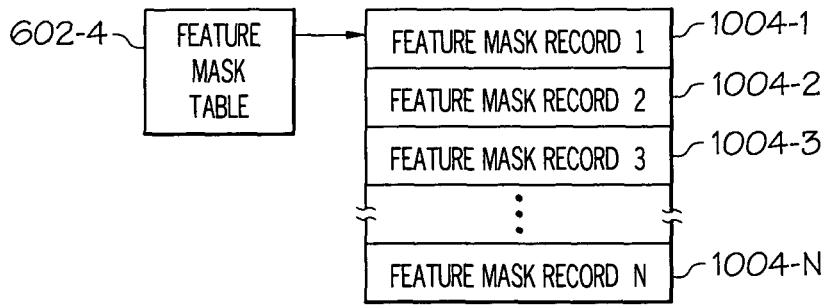

The feature mask table 602-4, as with the previously described tables in the structure section 304, and as shown in FIG. 10, includes a plurality of feature mask records 1004-1, 1004-2, 1004-3, ... 1004-N. In general, each feature mask record 1004-1, 1004-2, 1004-3, ... 1004-N corresponds to the above-described feature mask 210 for a specific data table 202-1, 202-2, 202-3, ... 202-N in a specific end-user system 102-1, 102-2, 102-3, ... 102-N. Thus, the feature mask table 602-4 will include feature mask records 1004-1, 1004-2, 1004-3, ... 1004-N for each end-user system 102-1, 102-2, 102-3, ... 102-N that uses data tables 202-1, 202-2, 202-3, ... 202-N that contain data records 204-1, 204-2, 204-3, ... 204-N with features. If an end-user system 102-1, 102-2, 102-3, ... 102-N does not use any data tables 202-1, 202-2, 202-3, ... 202-N that contain data records 204-1, 204-2, 204-3, ... 204-N with features, it will not have an associated feature mask record 1004-1, 1004-2, 1004-3, ... 1004-N. More specifically, each feature mask record 1004-1, 1004-2, 1004-3, ... 1004-N includes at least data representative of the identification of an end-user system 102-1, 102-2, 102-3, ... 102-N, the identification of a data table 202-1, 202-2, 202-3, ... 202-N, and one or more feature mask values. As was noted above, the feature mask values indicate which features, in the identified data table 202-1, 202-2, 202-3, ... 202-N, are compatible with the identified end-user system 102-1, 102-2, 102-3, ... 102-N.

It is noted that the feature mask records 1004-1, 1004-2, 1004-3, ... 1004-N, in a preferred embodiment, are actually "Feature Supported Mask Records," and the feature mask values in each record 1004-1, 1004-2, 1004-3, ... 1004-N are "Record Contains Feature" values. In other words, if a record 1004-1, 1004-2, 1004-3, ... 1004-N does not contain a feature, or the system supports that feature, the records are compatible. If a record 1004-1, 1004-2, 1004-3, ... 1004-N contains a feature and the system does not support that feature, then the record is not compatible. This is illustrated more clearly in the table shown below:

| | | Feature Mask Value | |
|---|---|---|---|
| | | Record Contains Feature | Record Does Not Contain Feature |
| Feature Mask Record | Feature Supported | Compatible | Compatible |
| | Feature Not Supported | Not Compatible | Compatible |

Figure 11:
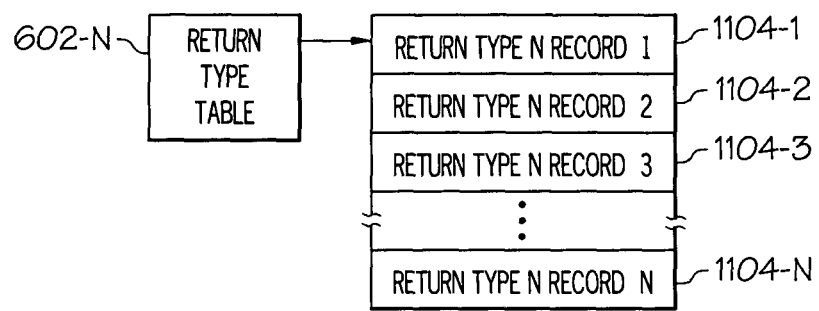

The return type tables 602-5, 602-6, 502-7, ... 602-N, an exemplary one of which is shown in FIG. 11, are used to define the data type of each retrievable data field 406 in the database 110. Examples of different data types include, but are not limited to, Boolean, integer, unsigned integer, floating point, and string. Multiple return type tables 602-5, 602-6, 602-7, ... 602-N are depicted since one or more of the end-user systems 102 may use different data types for each of the data fields 406. It will be appreciated that if each end-user system 102 uses the same data type for each of the data fields 406, then only a single return type table 602-5 would be used. No matter the exact number of return type tables, each includes a plurality of return type records 1104-1, 1104-2, 1104-3, ... 1104-N. These return type records 1104-1, 1104-2, 1104-3, ... 1104-N include data that identifies each data field 406, which is based on a portion of the data in each field definition record 804-1, 804-2, 804-3, ... 804-N, and data representative of the data type for each identified data field 406.

Figure 12:
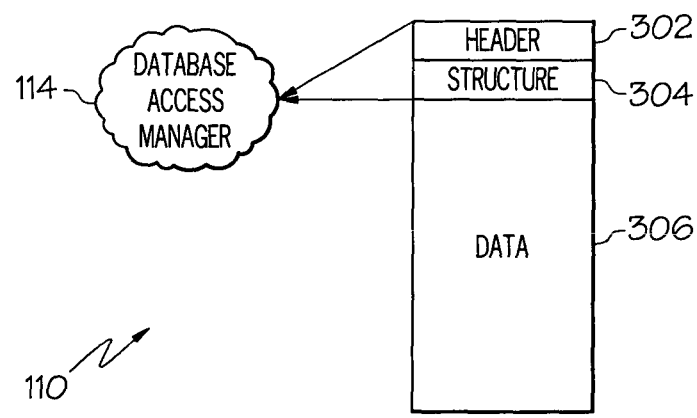
FIG. 12 is a simplified diagram that shows the interaction of a database access manager with the database in accordance with an exemplary embodiment of the present invention.

Returning now to FIG. 2, as was previously noted, each end-user system 102-1, 102-2, 102-3, ... 102-N includes the database access manager 114. The database access manager 114 is a program, which is preferably resident on each end-user system 102-1, 102-2, 102-3, ... 102-N, that is used by the end-user system 202 to extract compatible data records 204 from one or more data tables 202 in the database 110. The database access manager 114 is a software package that may be written in C++, or other high-level language, and functions to provide an end-user system 102 with access to the database data records 204. The database access manager 114 implements this function by interpreting the data in the structure tables 602. The database access manager 114 has no direct knowledge, and indeed needs no direct knowledge, of the physical representation (e.g., data layout and format) of the data records 204. Rather, the database access manager determines the layout and format of the data records 204 from the data in the structure tables 602, before providing access to the data. Thus, as illustrated in simplified form in FIG. 12, the database access manager 114 is decoupled from the data layout and format, which allows any end-user system 102 that includes the database access manager 114 to access the database 110. In addition, this decoupling aspect allows the database 110 to be modified (e.g., tables and/or fields added/relocated/deleted) without having to update the database access manager 114, or other system software.

The database described herein is formatted so that a single database may be used by multiple end-user systems of differing design and/or functionality, which provides significant advantages over current databases. For example, the database format substantially eliminates re-engineering costs associated with adding new data and/or functionality to one or more end-user systems, thereby allowing future growth. Since the data records include an explicit indication of compatibility with end-user systems, the number of databases that need to be produced is decreased, thereby decreasing database production costs. The database format also allows the database to be shared between different systems without compromising the data content associated with either system, which eliminates the costs associated with filtering out data that may be compatible with one system, but is not compatible with one or more other systems. In addition, the database format decouples the data format from database access manager, which allows any type of data to be accessed, and additionally eliminates the cost of developing a new, or upgrading old, database access software if a new database is created.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A program product, comprising:
   a) a database that is compatible with multiple end-user systems, the database comprising:
      a data section comprising a plurality of data tables, each data table including a plurality of data records that each have one or more features that affect its compatibility with one or more of the end-user systems, each data record including a feature field that contains one or more feature bits representative of each of its features; and
      a structure section comprising a plurality of feature mask tables, each feature mask table including a feature mask record for each of the multiple end-user systems that use one or more of the data tables that include the data records having one or more features, each feature mask record including one or more feature mask values that indicate whether the one or more features of a data record are compatible with one or more of the end-user systems, and thereby indicate whether the data record is compatible with one or more of the end-user systems; and
   b) at least one physical computer-readable medium having said database stored thereon.

2. The program product of claim 1, wherein the structure section further comprises a system identification table that includes data that uniquely identifies each of the end-user systems.

3. The program product of claim 2, wherein the system identification table comprises a plurality of system identification records, each system identification record associated with each of the end-user systems.

4. The program product of claim 1, wherein:
   the structure section further comprises a table pointer table that includes data that uniquely describes at least each of the data tables.

5. The program product of claim 4, wherein:
   the table pointer table comprises a plurality of table pointer records; and
   at least one table pointer record is associated with each of the data tables.

6. The program product of claim 5, wherein each table pointer record includes data representative of at least:
   a location of the associated data table;
   a number of the data records in the associated table; and
   a size of each data record in the associated data table.

7. The program product of claim 1, wherein:
   each data record includes a plurality of fields in addition to the feature field; and
   the structure section further comprises a field definition table that includes at least data representative of each of the data record fields.

8. The program product of claim 7, wherein the structure section further comprises one or more return type tables, each return type table including data representative of a format of each of the data record fields.

9. The program product of claim 1, further comprising:
   a header section that includes data representative of indicia that is used to identify the database.

10. The program product of claim 9, wherein the header section further includes data representative of a location of the structure section.

11. A method of generating a database that is compatible with multiple end-user systems, the method comprising the steps of:
    generating a data section;
    storing a plurality of data records in the data section, each data record including a feature field;
    associating one or more features with each data record;
    supplying each feature field with one or more feature bits that represent each of the features associated therewith;
    dividing the data section into a plurality of data tables that each include a plurality of the data records;
    generating a structure section that comprises a plurality of feature mask tables, each feature mask table including a feature mask record for each of the end-user systems that use one or more of the data tables that include the data records having one or more features; and
    including one or more feature mask values, in each feature mask record, that indicate whether the one or more features of a data record are compatible with one or more of the end-user systems, to thereby indicate whether the data record is compatible with one or more of the end-user systems.

12. The method of claim 11, further comprising:
    generating a system identification table that includes data that uniquely identifies each of the end-user systems.

13. The method of claim 12, further comprising:
    including a plurality of system identification records in the system identification table, each system identification record associated with each of the end-user systems.

14. The method of claim 11, further comprising:
    generating a table pointer table that includes data that uniquely describes at least each of the data tables.

15. The method of claim 14 further comprising:
    including a plurality of table pointer records in the table pointer table, at least one table pointer record is associated with each of the data tables.

16. The method of claim 15, further comprising:
    supplying each table pointer record with data representative of at least (i) a location of the associated data table, (ii) a number of the data records in the associated table and (iii) a size of each data record in the associated data table.

17. The method of claim 11, further comprising:
    including a plurality of fields, in addition to the feature field, in each data record; and
    generating a field definition table that includes at least data representative of each of the data record fields.

18. The method of claim 17, further comprising:
    generating one or more return type tables, each return type table including data representative of a format of each of the data record fields.

19. The method of claim 11, further comprising:
    generating a structure section and including the feature mask therein;
    generating a header section; and
    supplying the header section with data representative of indicia that is used to identify the database.

20. The method of claim 19, wherein the header section further includes data representative of a location of the structure section.

21. A computer system, comprising:
a processor;
memory in operable communication with the processor; and
a database stored in the memory, the database compatible with multiple end-user systems and including:
a data section comprising a plurality of data tables, each data table including a plurality of data records that each have one or more features that affect its compatibility with one or more of the end-user systems, each data record including a feature field that contains one or more feature bits representative of each of its features, and
a structure section comprising a plurality of feature mask tables, each feature mask table including a feature mask record for each of the multiple end-user systems that use one or more of the data tables that include the data records having one or more features, each feature mask record including one or more feature mask values that indicate whether the one or more features of a data record are compatible with one or more of the end-user systems, and thereby indicate whether the data record is compatible with one or more of the end-user systems.

22. The system of claim 21, wherein the structure section further comprises a system identification table that includes data that uniquely identifies each of the end-user systems.

23. The system of claim 22, wherein the system identification table comprises a plurality of system identification records, each system identification record associated with each of the end-user systems.

24. The system of claim 21, wherein:
the structure section further comprises a table pointer table that includes data that uniquely describes at least each of the data tables.

25. The system of claim 24, wherein:
the table pointer table comprises a plurality of table pointer records; and
at least one table pointer record is associated with each of the data tables.

26. The system of claim 25, wherein each table pointer record includes data representative of at least:
a location of the associated data table;
a number of the data records in the associated table; and
a size of each data record in the associated data table.

27. The database of claim 21, wherein:
each data record includes a plurality of fields in addition to the feature field; and
the structure section further comprises a field definition table that includes at least data representative of each of the data record fields.

28. The system of claim 27, wherein the structure section further comprises one or more return type tables, each return type table including data representative of a format of each of the data record fields.

29. A flight management system, comprising:
memory;
a navigation database stored in the memory, the navigation database compatible with multiple flight management systems and including:
a data section comprising a plurality of data tables, each data table including a plurality of navigational data records that each have one or more features that affect its compatibility with one or more of the flight management systems, each data record including a feature field that contains one or more feature bits representative of each of its features, and
a structure section a comprising a plurality of feature mask tables, each feature mask table including a feature mask record for each of the flight management systems that use one or more of the data tables that include the navigational data records having one or more features, each feature mask record including one or more feature mask values that indicate whether the one or more features of a navigational data record are compatible with one or more of the flight management systems, and thereby indicate whether the data record is compatible with one or more of the flight management systems; and
a processor configured to generate an aircraft flight plan based at least in part on the navigational data stored in the navigation database.

* * * * *